United States Patent [19]
Hirota et al.

[11] Patent Number: 4,682,251
[45] Date of Patent: Jul. 21, 1987

[54] VIDEO SIGNAL REPRODUCING APPARATUS HAVING A NOISE REDUCTION CIRCUIT

[75] Inventors: Akira Hirota, Chigasaki; Takuya Tsushima, Ayase, both of Japan

[73] Assignee: Victor Company of Japan, Ltd., Yokohama, Japan

[21] Appl. No.: 713,787

[22] Filed: Mar. 20, 1985

[30] Foreign Application Priority Data

Mar. 21, 1984 [JP] Japan .................................. 59-53997
Mar. 21, 1984 [JP] Japan .................................. 59-53998
Mar. 21, 1984 [JP] Japan .................................. 59-53999

[51] Int. Cl.$^4$ ............................................. H04N 5/91
[52] U.S. Cl. ................................... 360/33.1; 360/9.1; 358/340; 358/167; 358/335
[58] Field of Search ........................ 360/33.1, 32, 9.1; 358/340, 327, 167, 335, 329, 36

[56] References Cited

U.S. PATENT DOCUMENTS 4,058,836 11/1977 Drewery ............................... 358/36
4,513,311 4/1985 Hiroi ................................... 358/329
4,563,704 1/1986 Hirota ................................. 358/167

FOREIGN PATENT DOCUMENTS 3131966 3/1982 Fed. Rep. of Germany ...... 358/167
3223066 1/1983 Fed. Rep. of Germany ...... 358/167

OTHER PUBLICATIONS

BKSTS Dictionary of Audio–Visual Terms, ©1983, pp. 1, 30, 31, 86, 87, published by Butterworth & Co.

Primary Examiner—Alan Faber
Attorney, Agent, or Firm—Michael N. Meller

[57] ABSTRACT

A video signal reproducing apparatus comprises a reproducing circuit for reproducing from a recording medium a pre-recorded video signal having field correlation and having a predetermined band, and a noise reduction circuit supplied with a reproduced video signal from the reproducing circuit for essentially reducing noise included within the reproduced video signal. The noise reduction circuit comprises first and second subtracting circuits supplied with the reproduced video signal from the reproducing circuit, a one-field delay circuit for delaying an output of the first subtracting circuit by a predetermined time period and for supplying a delayed signal to the second subtracting circuit, which predetermined time period is equal to one field or a time period which is a natural number multiple of one horizontal scanning period and is extremely close to one field, and a limiter for amplitude-limiting an output of the second subtracting circuit and for supplying an amplitude limited signal to the first subtracting circuit. The output of the first subtracting circuit is obtained as an output of the noise reduction circuit. The one-field delay circuit has a transmission band which is narrower than a band of the reproduced video signal.

12 Claims, 28 Drawing Figures

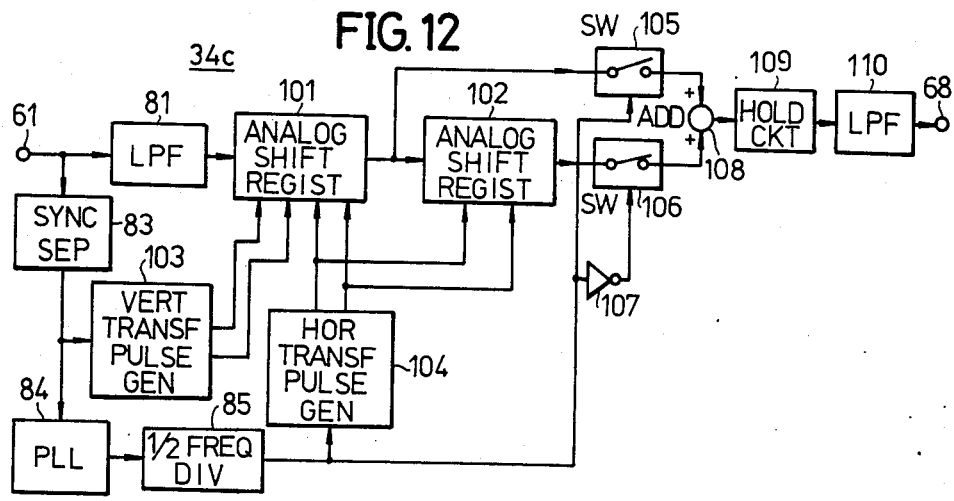
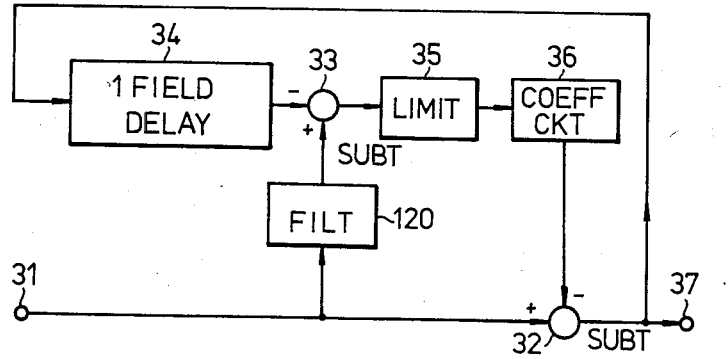
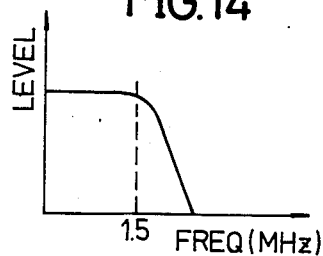

VIDEO SIGNAL REPRODUCING APPARATUS HAVING A NOISE REDUCTION CIRCUIT

BACKGROUND OF THE INVENTION

The present invention generally relates to video signal reproducing apparatuses having a noise reduction circuit, and more particularly to a video signal reproducing apparatus having a noise reduction circuit for reducing noise within a reproduced video signal by use of the field correlation in an input video signal by employing in a feedback path thereof a one-field delay circuit having a band narrower than the band of the input video signal.

Conventionally, in an apparatus for recording and reproducing a video signal on and from a recording medium such as magnetic tape, a noise reduction circuit is provided in a reproducing system to reduce noise within a reproduced video signal. The noise reduction circuit reduces the noise within the reproduced video signal to such an extent that the noise in a reproduced picture is permissible from the practical point of view. Various types of noise reduction circuits have been proposed. As one type of a conventional noise reduction circuit for reducing the noise within the reproduced video signal, there is the so-called recursive type field correlation noise reducer which comprises a one-field delay circuit in a feedback path thereof and reduces the noise within the reproduced video signal by use of the field correlation in the video signal.

As will be described later on in the specification by referring to drawings, a digital memory circuit, an analog shift register or the like is conventionally used for the one-field delay circuit within the recursive type field correlation noise reducer. However, when the digital memory circuit, the analog shift register or the like is used for the one-field delay circuit, the recursive type field correlation noise reducer becomes expensive because of the need to reserve the transmission band of the reproduced video signal. As a result, the cost of the recording and reproducing apparatus as a whole becomes high, and the use of such a one-field delay circuit in a video signal recording and reproducing apparatus for home use is disadvantageous because of the demand to manufacture the video signal recording and reproducing apparatus for home use at a low cost.

SUMMARY OF THE INVENTION

Accordingly, it is a general object of the present invention to provide a novel and useful video signal reproducing apparatus having a noise reduction circuit, in which the disadvantages described heretofore are eliminated.

Another and more specific object of the present invention is to provide a video signal reproducing apparatus having a noise reduction circuit which is the so-called recursive type field correlation noise reducer, and a digital memory circuit or an analog shift register having a band narrower than the transmission band of a video signal including noise which is to be reduced is used for a one-field delay circuit within the noise reduction circuit. According to the video signal reproducing apparatus of the present invention, it is possible to obtain a noise reducing effect with respect to a high-frequency noise component having a small amplitude because it is possible to eliminate an input signal part having a high frequency and a small amplitude. In other words, it is possible to perform a noise cancelling. Since a circuit having a narrow band can be used for the one-field delay circuit, it is possible to manufacture the noise reduction circuit at a low cost. When the analog shift register is used for the one-field delay circuit, is it possible to manufacture at least the one-field delay circuit in the form of an integrated circuit.

Still another object of the present invention is to provide a video signal reproducing apparatus having a noise reduction circuit in which the band of a delay circuit for delaying a video signal by one field or a time period extremely close to one field is selected to a band narrower than the transmission band of an input video signal. A first clock pulse has a repetition frequency greater than or equal to twice the upper limit frequency of the transmission band, and a second clock pulse has a repetition frequency which is approximately one-half that of the first clock pulse and a phase which is inverted for every one horizontal scanning period (1H). A signal obtained by sampling the input video signal by the second clock pulse is written into the delay circuit and a signal written a first time period before and a signal written a second time period before are alternately read out from the delay circuit in phase synchronism with the first clock pulse, where the first time period is equal to a time period of one field of the input video signal (hereinafter simply referred to as one field period) plus a time period of H/2 and the second time period is equal to one field period minus a time period of H/2. According to the video signal reproducing apparatus of the present invention, the input video signal is written into a memory circuit (for example, a read only memory or an analog shift register) within the delay circuit based on a clock pulse having a phase which is inverted for every 1H, and a video signal delayed by a delay time of one field period minus the time period of H/2 and a video signal delayed by a delay time of one field period plus the time period of H/2 are alternately read out from the memory circuit based on a clock pulse having a frequency which is twice that of the clock pulse at the time of the write-in. A reproduced video signal which is delayed by one field period is obtained from an output of the memory circuit. As a result, the write-in and read-out to and from the memory circuit can be performed in a narrow band, and the memory circuit can be manufactured at a low cost. In addition, since the band of the signal stored in the memory circuit is in the same range as the band of the memory circuit, no deterioration will be introduced in a high-frequency component having a small amplitude. Further, by alternately switching the delay time, it is possible to make the smear in the vertical direction of the picture less conspicuous compared to a noise reduction circuit which uses a delay circuit having a fixed delay time which is a natural number multiple of 1H and is extremely close to one field period.

A further object of the present invention is to provide a video signal reproducing apparatus having a noise reduction circuit of a recursive type which uses the field correlation in a video signal to reduce noise, wherein the band of a delay circuit within the noise reduction circuit having a delay time which is a natural number multiple of 1H and is extremely close to one field period, is selected to a band narrower than the transmission band of an input video signal. The noise reduction circuit has a filter circuit having the same frequency characteristic as the delay circuit, and an output signal of the delay circuit is subtracted from the input video signal which has passed through the filter circuit. According to the video signal reproducing apparatus of the present invention, the high-frequency component of the input video signal having a small amplitude will not be attenuated. For this reason, the resolution of the video signal having the small amplitude will not be deteriorated. Especially in a case where the present invention is applied to a video signal reproducing apparatus having a noise cancel circuit in a reproducing system thereof, the attenuation of the high-frequency component of the reproduced video signal having the small amplitude can be limited to the attenuation introduced by the noise cancel circuit. Hence, it is possible to suppress the deterioration in the resolution of the video signal having the small amplitude to a minimum.

Another object of the present invention is to provide a video signal recording and reproducing apparatus in which the band of a one-field delay circuit within a recursive type field correlation noise reducer is selected to a band narrower than the transmission band of an input reproduced video signal in a reproducing system thereof, and a correcting circuit having a frequency characteristic approximately complementary to the frequency characteristic of the one-field delay circuit of the noise reducer is provided in a recording system thereof. An input video signal which is to be recorded is supplied to the correcting circuit. According to the video signal recording and reproducing apparatus of the present invention, there is virtually no deterioration in the high-frequency reproduced video signal component having a small amplitude in the reproducing system. Thus, it is possible to substantially prevent the resolution of the video signal having the small amplitude from becoming deteriorated. In addition, in the band which is the same as the band of the one-field delay circuit, it is possible to perform the noise reducing operation in the noise reducer by use of the field correlation in the video signal, as in the case of the conventional noise reduction circuit. Moreover, the noise reducer performs a noise cancelling with respect to the high-frequency component of the reproduced video signal having the small amplitude so as to reduce the noise.

Other objects and further features of the present invention will be apparent from the following detailed description when read in conjunction with the accompanying drawings.

BRIEF DESCRIPTION OF THE DRAWINGS

FIG. 12 is a system block diagram showing a third embodiment of the one-field delay circuit;

FIG. 13 is a system block diagram showing a second embodiment of the noise reduction circuit;

FIG. 14 shows the frequency characteristic of a one-field delay circuit or a filter circuit within the block system shown in FIG. 13;

DETAILED DESCRIPTION

Figure 1A:
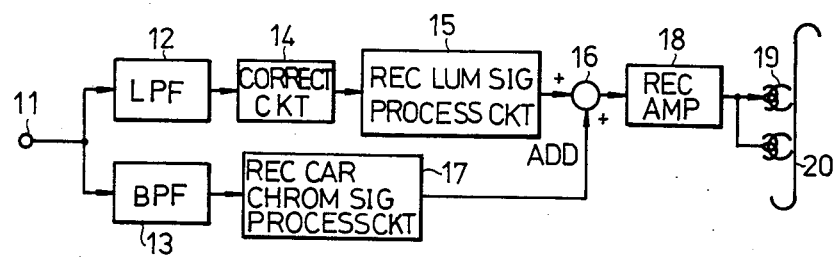
FIGS. 1A and 1B are system block diagrams showing a recording system and a reproducing system of an embodiment of the video signal recording and reproducing apparatus according to the present invention, respectively.

First, a general description will be given with respect to a recording system of the video signal recording and reproducing apparatus according to the present invention, by referring to FIG. 1A. A color video signal which is to be recorded is applied to an input terminal 11. The color video signal is supplied to a lowpass filter 12 wherein a luminance signal is separated and filtered, and to a bandpass filter 13 wherein a carrier chrominance signal is separated and filtered. The luminance signal from the lowpass filter 12 is supplied to a correcting circuit 14 which constitutes an essential part of the recording system and will be described later. The correcting circuit 14 amplifies the high-frequency component having a small amplitude. An output luminance signal of the correcting circuit 14 is supplied to a recording luminance signal processing circuit 15 wherein the luminance signal is passed through a known pre-emphasis circuit, a frequency modulator and the like and is converted into a frequency modulated luminance signal. The frequency modulated luminance signal is supplied to an adder 16.

On the other hand, the carrier chrominance signal from the bandpass filter 13 is supplied to a recording carrier chrominance signal processing circuit 17 wherein the carrier chrominance signal is frequency-converted into a low-frequency range which is lower than the band of the frequency modulated luminance signal. In the recording carrier chrominance signal processing circuit 17, the carrier chrominance signal is subjected to a known processing as a measure against crosstalk according to the needs. An output frequency converted carrier chrominance signal of the recording carrier chrominance signal processing circuit 17 is supplied to the adder 16. The adder 16 obtains a frequency division multiplexed signal by frequency-division-multiplexing the frequency modulated luminance signal and the frequency converted carrier chrominance signal, and supplies the frequency division multiplexed signal to rotary heads 19 through a recording amplifier 18. As a well known, the rotary heads 19 successively record the frequency division multiplexed signal on video tracks which are formed obliquely to the longitudinal direction of a magnetic tape 20, which magnetic tape 20 is spirally wrapped around the outer peripheral surface of a drum which is mounted with the rotary heads 19.

Next, a description will be given with respect to a reproducing system of the video signal recording and reproducing apparatus according to the present invention, by referring to FIG. 1B. The pre-recorded frequency division multiplexed signal on the magnetic tape 20 is reproduced by the rotary heads 19, and is supplied to a highpass filter 22 and a lowpass filter 23, through a reproducing amplifier 21. The highpass filter 22 separates and filters the frequency modulated luminance signal from the reproduced time division multiplexed signal, and supplies the frequency modulated luminance signal to a reproduced luminance signal processing circuit 24. The frequency modulated luminance signal is successively passed through a frequency demodulator, a de-emphasis circuit and the like within the reproduced luminance signal processing circuit 24, and is demodulated into a reproduced luminance signal. The reproduced luminance signal is supplied to a noise reduction circuit 25 which constitutes an essential part of the video signal (recording and) reproducing apparatus according to the present invention. The noise reduction circuit 25 reduces noise within the reproduced luminance signal, and an output reproduced luminance signal of the noise reduction circuit 25 is supplied to an adder 26.

On the other hand, the frequency converted carrier chrominance signal within the reproduced frequency division multiplexed signal is frequency-selected in the lowpass filter 23 and is supplied to a reproduced carrier chrominance signal processing circuit 27. As is well known, in the reproduced carrier chrominance signal processing circuit 27, the frequency converted carrier chrominance signal is frequency-converted back into the original band, eliminated of the deviation in the reproduced time base thereof and is eliminated of the crosstalk component from the adjacent video track by use of a comb filter. An output reproduced carrier chrominance signal of the reproduced carrier chrominance signal processing circuit 27 is supplied to the adder 26 and is added with the reproduced luminance signal from the noise reduction circuit 25. An output reproduced color video signal of the adder 26, which is in conformance with a predetermined standard system, is produced through an output terminal 28 and is supplied to a receiver (not shown).

Figure 2:
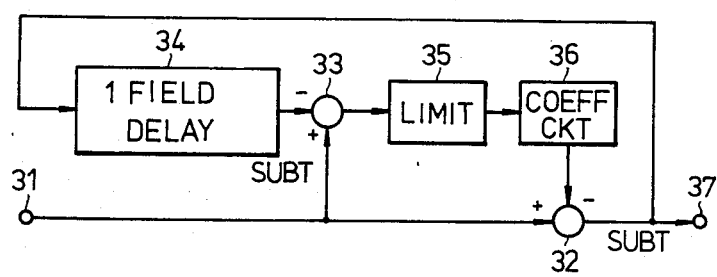
FIG. 2 is a system block diagram showing a first embodiment of a noise reduction circuit which constitutes an essential part of the video signal recording and reproducing apparatus shown in FIG. 1.

A first embodiment of the noise reduction circuit 25 which constitutes an essential part of the apparatus according to the present invention, is shown in FIG. 2. The reproduced luminance signal from the reproduced luminance signal processing circuit 24, which is applied to an input terminal 31, includes the noise which is generated during the recording and reproducing process. The input reproduced luminance signal from the input terminal 31 is supplied to one input terminal of each of subtracting circuits 32 and 33. An output reproduced luminance signal of the subtracting circuit 32 is supplied to a one-field delay circuit 34 which constitutes an essential part of the noise reduction circuit 25, and is delayed by a delay time of one field or by a time period which is a natural number multiple of one horizontal scanning period (1H) and is extremely close to a time period of one field (one field period). An output delayed reproduced luminance signal of the one-field delay circuit 34 is supplied to the other input terminal of the subtracting circuit 33. The subtracting circuit 33 subtracts the output delayed reproduced luminance signal of the one-field delay circuit 34 from the input reproduced luminance signal obtained through the input terminal 31. An output signal of the subtracting circuit 33 is passed through a limiter 35 and a coefficient multiplying circuit 36, and is then supplied to the other input terminal of the subtracting circuit 32. Generally, the so-called field correlation exists in the luminance signal and the luminance signals separated by an interval of one field contain extremely similar luminance information. However, the noise component occur at random and the field correlation does not exist with respect to the noise component.

Accordingly, the noise component having no field correlation is mainly obtained from the subtracting circuit 32. The limiter 35 limits the amplitude of the output signal of the subtracting circuit 32 mainly comprising the noise component, to approximately the peak-to-peak level of the noise. The coefficient multiplying circuit 36 performs a desired weighting with respect to an output signal of the limiter 35. The subtracting circuit 32 subtracts an output signal of the coefficient multiplying circuit 36 from the input reproduced luminance signal obtained through the input terminal 31, to substantially cancel the noise within the input reproduced luminance signal from the input terminal 31 by the output signal of the coefficient multiplying circuit 36. An output signal of the subtracting circuit 32 is fed back to the one-field delay circuit 34 and is also produced through an output terminal 37. Hence, the input reproduced luminance signal is reduced of the noise and is obtained through the output terminal 37.

The constitution of the block system of the noise reduction circuit 25 shown in FIG. 2, is the same as that of the conventional noise reduction circuit which is sometimes referred to as the recursive type field correlation noise reducer. However, in the conventional noise reduction circuit, the frequency characteristic of the one-field delay circuit is selected to a characteristic of a wide band so as not to limit the transmission band of the input reproduced luminance signal. On the other hand, in the apparatus according to the present invention, the frequency characteristic of the one-field delay circuit 34 is selected to such a characteristic that the band of the input reproduced luminance signal is limited.

Figure 3A:
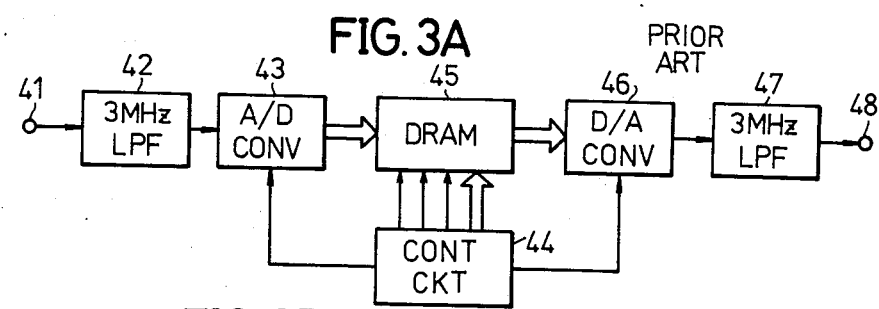
FIGS. 3A and 3B are system block diagrams showing examples of a conventional one-field delay circuit.

The one-field delay circuit 34 within the noise reduction circuit is conventionally constituted by a digital memory circuit or an analog shift register which employs charge transfer elements such as charge coupled devices (CCDs). However, in either case, there is a disadvantage in that the one-field delay circuit 34 becomes expensive because of the need to reserve a desired transmission band for the reproduced luminance signal. An example of a conventional one-field delay circuit which corresponds to the one-field delay circuit 34 and uses a digital memory circuit, is shown in FIG. 3A. In FIG. 3A, the output reproduced luminance signal of the subtracting circuit 32 is applied to an input terminal 41. When it is assumed that the desired transmission band of the reproduced luminance signal is 0 to 3 MHz, the reproduced luminance signal is passed through a lowpass filter 42 having an upper cutoff frequency of approximately 3 MHz and is supplied to an analog-to-digital (A/D) converter 43. The A/D converter 43 subjects the output reproduced luminance signal of the lowpass filter 42 to an analog-to-digital conversion based on a clock pulse from a control circuit 44. Since the transmission band of the reproduced luminance signal is 0 to 3 MHz, the sampling frequency of the reproduced luminance signal must be over 6 MHz according to the Nyquist sampling theorem.

When it is assumed that the reproduced luminance signal is sampled at a frequency which is twice the chrominance subcarrier frequency, the number of sampling points per 1H is approximately equal to 455 ($\approx 7160/15.625$) in the case of the NTSC system color video signal, since the sampling frequency is approximately equal to 7.16 MHz and the horizontal scanning frequency is equal to 15.625 kHz in the case of the NTSC system color video signal. Accordingly, the number of sampling points per field may be obtained by multiplying 525/2 to 455, and the number of sampling points per field is approximately equal to $119.4 \times 10^3$. When it is assumed that the quantization number per sampling point is 8 bits, an 8-bit digital signal is obtained from the A/D converter 43 and is supplied to a dynamic random access memory (DRAM) 45.

The 8-bit digital signal from the A/D converter 43 is written into the DRAM 45 based on read/write signals, write-in and read-out clock pulses, an address signal and the like from the control circuit 44. After the 8-bit digital signal is written into the DRAM 45, the data of one field before is read out from the DRAM 45 and is supplied to a digital-to-analog (D/A) converter 46. The D/A converter 46 subjects the digital signal which is delayed by one field and is read out from the DRAM 45 to a digital-to-analog conversion to obtain an analog video signal. The analog video signal is passed through a lowpass filter 47 having an upper limit cutoff frequency of 3 MHz, and is obtained through an output terminal 48.

As described before, the digital signal supplied to the DRAM 45 has the quantization number of 8 bits per sampling point, and the number of sampling points per field is approximately equal to $119.4 \times 10^3$. Accordingly, the DRAM 45 must have a memory capacity of $119.4 \times 10^3$ bits, which means that it is necessary to use 16 DRAMs having a memory capacity of 64 kbits. For this reason, the conventional one-field delay circuit is quite expensive.

Figure 3B:
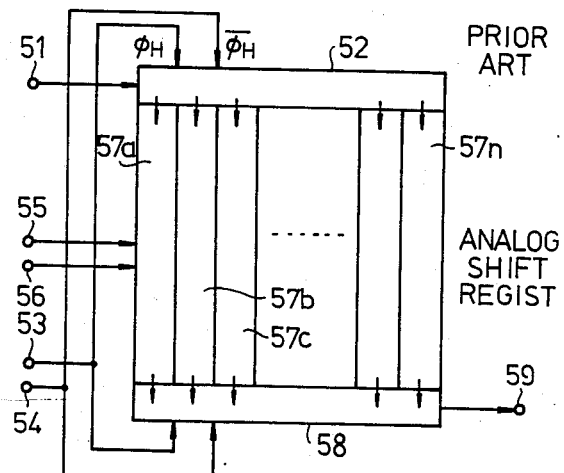

Another example of a conventional one-field delay circuit which uses an analog shift register, is shown in FIG. 3B. The reproduced luminance signal is supplied serially to the analog shift register through an input terminal 51. The reproduced luminance signal is shifted to the right (horizontally) in FIG. 3B within an input horizontal transfer register 52 responsive to horizontal transfer clock pulses $\phi_H$ and $\bar{\phi}_H$ having mutually opposite phases and received through input terminals 53 and 54. The input horizontal transfer register 52 is constituted by a CCD comprising n cells, where n is a natural number. When n horizontal transfer clock pulses are supplied to the horizontal transfer register 52 within 1H, the luminance information (sampled information) corresponding to 1H of the reproduced luminance signal is written into the n stages of the CCD to the full capacity thereof. Thereafter, vertical transfer clock pulses $\phi_V$ and $\bar{\phi}_V$ having mutually opposite phases and received through input terminals 55 and 56 are applied to the analog shift register once within the horizontal blanking period. As a result, the n sampled information stored in the n cells of the CCD are supplied in parallel to a first stage of each of n vertical transfer registers 57a through 57n having m stages, where m is a natural number, and are stored in the first stage of each of the vertical transfer registers 57a through 57n.

Each of the vertical transfer registers 57a through 57n is constituted by a CCD comprising m cells, and successively performs a vertical transfer in terms of one stage based on the vertical transfer clock pulses $\phi_V$ and $\bar{\phi}_V$ obtained from the input terminals 55 and 56 once per 1H. The n sampled information are supplied in parallel to an output horizontal transfer register 58 when m vertical transfers are performed in each of the vertical transfer registers 57a through 57n. The output horizontal transfer register 58 is constituted by a CCD comprising n cells, and the n sampled information are produced serially within 1H through an output terminal 59 based on the horizontal transfer clock pulses $\phi_H$ and $\bar{\phi}_H$ described before. As a result, a reproduced luminance signal which is obtained by delaying the reproduced luminance signal applied to the input terminal 51 by a delay time of (m+1)H, is obtained through the output terminal 59. Accordingly, by selecting the number of stages m in each of the vertical transfer registers 57a through 57n to 261 or 262, it is possible to obtain a reproduced luminance signal which is delayed by one field (262H or 263H).

As described before, the number of sampling points per 1H is approximately equal to 455, and thus, each of the horizontal transfer registers 52 and 58 and the vertical transfer registers 57a through 57n is constituted by a CCD comprising 455 cells. Therefore, in a case where the analog shift register is manufactured in the form of an integrated circuit (IC), the chip area becomes large and the integrated circuit becomes expensive. In a case where the chip area is extremely large, it becomes impossible to manufacture the analog shift register in the form of a single chip.

Figure 4:
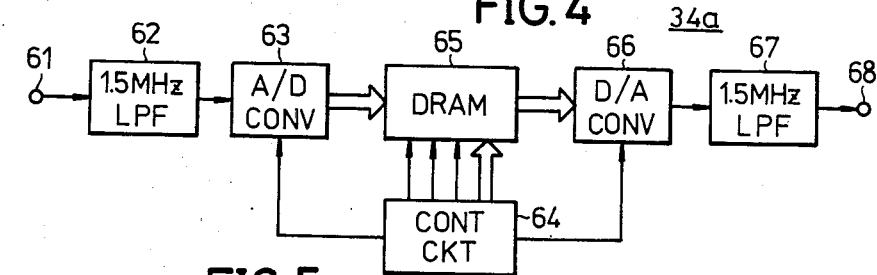
FIG. 4 is a system block diagram showing a first embodiment of a one-field delay circuit used in the noise reduction circuit shown in FIG. 2.

A first embodiment of a one-field delay circuit 34 in the apparatus according to the present invention, in which the disadvantages of the conventional one-field delay circuits described before are eliminated, will now be described in conjunction with FIG. 4. In FIG. 4, the reproduced luminance signal obtained from the subtracting circuit 32 shown in FIG. 2 is applied to an input terminal 61 of a one-field delay circuit 34a. The reproduced luminance signal is passed through a lowpass filter 62 having an upper limit cutoff frequency of 1.5 MHz and is supplied to an A/D converter 63. The reproduced luminance signal is sampled based on a clock pulse (sampling pulse) from a control circuit 64 and is converted into a digital signal having a quantization number of 8 bits in the A/D converter 63. A repetition frequency $f_s$ of the sampling pulse from the control circuit 64 is selected to a frequency equal to the chrominance subcarrier frequency (3.58 MHz in the case of the NTSC system color video signal) of the color video signal. Accordingly, the sampling points per 1H is equal to 227 or 228 in the digital signal obtained from the A/D converter 63.

The output digital signal of the A/D converter 63 is supplied to a DRAM 65 and is written into the DRAM 65 based on read/write signals, write-in and read-out clock pulses, an address signal and the like from the control circuit 64.

For example, a circuit DPS-1 manufactured by Digital Video Systems of Canada may be used for the control circuit 64.

In the present embodiment, the sampling frequency $f_s$ in the A/D converter 63 is selected to one-half the sampling frequency in the A/D converter 43 of the conventional circuit shown in FIG. 3A. For this reason, the number of sampling points per field is one-half that of the conventional circuit, and the memory capacity of the DRAM 65 of the present embodiment is one-half that of the DRAM 45 in the conventional circuit. Therefore, the DRAM 65 can be constituted by 8 DRAMs having a memory capacity of 64 kbits. The stored digital signal of one field before is read out from the DRAM 65 under the control of the control circuit 64, and is supplied to a D/A converter 66.

A clock pulse having a repetition frequency which is one-half that of the conventional case, is supplied to the D/A converter 66 from the control circuit 66 so as to convert the output digital signal of the DRAM 65 into an analog signal. The analog signal is passed through a lowpass filter 67 having an upper limit cutoff frequency of 1.5 MHz, and a reproduced luminance signal which is delayed by one field is obtained through an output terminal 68.

According to the present embodiment, the circuit construction is simple and the circuit can be manufactured at a low cost, because the memory capacity of the DRAM 65 is one-half that of the DRAM 45 in the conventional circuit and the DRAM 65 can be constituted by 8 DRAMs having the memory capacity of 64 kbits.

In addition, even in the case where the analog shift register shown in FIG. 3B is used for the one-field delay circuit 34, the sampling frequency can be selected to one-half that of the conventional case, as is done in the present embodiment. In this case, the number n of the cells of the CCD required to constitute each of the registers 52, 57a through 57n and 58 can be reduced to one-half, that is, to n/2. Hence, it is possible in this case to reduce the chip area of the analog shift register which is manufactured in the form of an integrated circuit, and the one-field delay circuit can be manufactured in the form of an integrated circuit at a low cost.

Because the sampling frequency is selected to one-half that of the conventional circuit according to the present embodiment as described heretofore, it is only possible to transmit a signal component in a transmission band of 0 to 1.5 MHz which is one-half the transmission band of 0 to 3 MHz of the reproduced luminance signal. However, by making the band of the one-field delay circuit 34 narrow in this manner, the circuit shown in FIG. 2 produces the following noise reducing effect.

Figure 5:
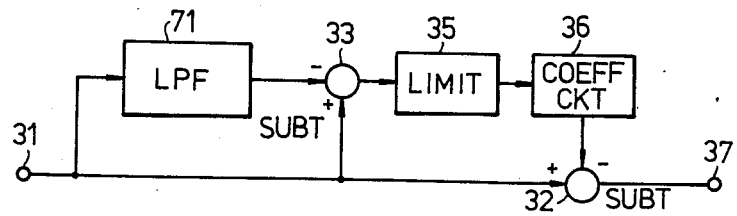
FIG. 5 is a circuit diagram showing an equivalent of the noise reduction circuit shown in FIG. 2 when the field correlation exists in an input video signal of the noise reduction circuit.

That is, when it is assumed that the reproduced luminance signal applied to the input terminal 31 has a perfect field correlation, the noise reduction circuit 25 shown in FIG. 2 may be considered equivalent to a circuit shown in FIG. 5. In FIG. 5, those parts which are the same as those corresponding parts in FIG. 2 are designated by the same reference numerals, and their description will be omitted. For example, when the band of the one-field delay circuit 34 is equal to 1.5 MHz, the one-field delay circuit 34 is equivalent to a circuit in which a lowpass filter 71 is provided between the input terminal 31 and the subtracting circuit 33 as shown in FIG. 5, which lowpass filter 71 is for blocking a frequency component of over 1.5 MHz within the reproduced luminance signal from the input terminal 31.

Accordingly, a signal component having a frequency of over 1.5 MHz and a small amplitude which is under the limiting level of the limiter 35, is passed through the limiter 35 and the coefficient multiplying circuit 36 and is supplied to the subtracting circuit 32. Hence, the signal component within the reproduced luminance signal, having the frequency of over 1.5 MHz and the small amplitude which under the limiting level of the limiter 35, is subtracted from the reproduced luminance signal in the subtracting circuit 32. For this reason, a reproduced luminance signal which is reduced of the signal component having the frequency of over 1.5 MHz and the small amplitude which is under the limiting level of the limiter 35, is obtained through the output terminal 37.

Since the noise included within the reproduced luminance signal are mostly high-frequency components having a small amplitude, it is possible to effectively reduce the noise from the reproduced luminance signal. This reduction of noise is sometimes referred to as noise cancelling. According to this noise cancelling, the high-frequency component of the reproduced luminance signal having the small amplitude, is cancelled together with the noise. Hence, there is a problem in that the resolution in the horizontal direction of the picture becomes deteriorated with respect to the small amplitude component. However, when the transmission band of the DRAM 65 is made narrow as in the present embodiment, it is possible to obtain two superior effects which are reduced manufacturing cost and noise cancelling effect, which two effects are extremely important to the video signal recording and reproducing apparatus (video tape recorder or VTR) for home use. Therefore, the present embodiment is considerably superior as a whole compared to the conventional circuit.

Figure 6:
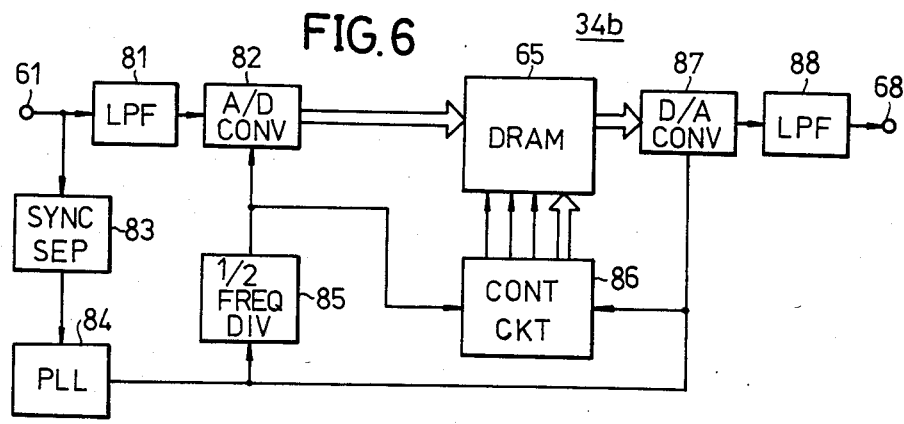
FIG. 6 is a system block diagram showing a second embodiment of the one-field delay circuit.

Next, a description will be given with respect to a second embodiment of the one-field delay circuit by referring to FIG. 6. In FIG. 6, those parts which are the same as those corresponding parts in FIG. 4 are designated by the same reference numerals. The reproduced luminance signal from the subtracting circuit 32 which is applied to the input terminal 61 of a one-field delay circuit 34b, is passed through a lowpass filter 81 having an upper limit cutoff frequency of approximately 3 MHz and is supplied to an A/D converter 82. On the other hand, the reproduced luminance signal applied to the input terminal 61 is also supplied to a synchronizing signal separating circuit 83 wherein a horizontal synchronizing signal is separated. The separated horizontal synchronizing signal from the synchronizing signal separating circuit 83 is supplied to a phase locked loop (PLL) 84. The PLL 84 generates a signal which is in phase synchronism with the horizontal synchronizing signal within the reproduced luminance signal, and for example, the output signal of the PLL 84 has a frequency of approximately 7.16 MHz which is 455 times the horizontal scanning frequency $f_H$. The output signal of the PLL 84 is supplied to a ½-frequency divider 85 and to a control circuit 86.

The frequency divider 85 frequency-divides the signal having the frequency of approximately 7.16 MHz by one-half, and generates a pulse having a frequency of 3.58 MHz which is equal to the chrominance subcarrier frequency of the NTSC system. The output pulse of the frequency divider 85 is supplied to the A/D converter 82 as a clock pulse. The output pulse of the frequency divider 85 is also supplied to the control circuit 86. The lowpass filter 81 which is provided in a stage preceding the A/D converter 82, is for preventing the generation of aliasing noise. The upper limit cutoff frequency of the lowpass filter 81 must normally be set to a frequency under one-half the clock pulse frequency of 3.58 MHz of the A/D converter 82, according to the Nyquist sampling theorem. However, according to the present embodiment, the upper limit cutoff frequency of the lowpass filter 81 need only be set to a frequency lower than the clock pulse frequency of the A/D converter 82 as will be described later, and for this reason, the upper limit cutoff frequency of the lowpass filter 81 is selected to approximately 3 MHz.

The clock pulse of the A/D converter 82 must be such a pulse that the phase thereof is inverted for every 1H and the frequency thereof is one-half the clock frequency of a D/A converter 87 which will be described later. In the present embodiment, the clock pulse frequency of the A/D converter 82 is equal to 3.58 MHz which is an odd number multiple of one-half the horizontal scanning frequency $f_H$. Thus, the phase of the clock pulse of the A/D converter 82 is inverted for every 1H and the clock pulse of the A/D converter 82 is one-half the clock pulse frequency of approximately 7.14 MHz of the D/A converter 87, and the two conditions are satisfied in the present embodiment. These two conditions must be satisfied in order to obtain a delayed reproduced luminance signal having a band wider than the band of the DRAM 65, and a more detailed description on the reason why the two conditions must be satisfied will be given later on in the specification.

The A/D converter 82 samples the output reproduced luminance signal of the low pass filter 81 based on the clock pulse from the frequency divider 85 and converts the reproduced luminance signal into a digital signal having a quantization number of 8 bits per sampling point. The output digital signal of the A/D converter 82 is supplied to the DRAM 65. As described before, the DRAM 65 is constituted by 8 DRAMs having a memory capacity of 64 kbits, and thus, the DRAM 65 has a memory capacity which is sufficient to store the sampled data corresponding to one field. Accordingly, the output digital signal of the A/D converter 82 corresponding to one field, is written into the DRAM 65 based on an output control signal of the control circuit 86.

The control circuit 86 controls the DRAM 65 so that among the stored digital data, the digital data of a time period of 263H before and the digital data of a time period of 262H before are alternately read out from the DRAM 65 based on the clock pulse having the frequency which is twice the sampling frequency of 3.58 MHz described before, where the time period of 263H is obtained by adding 0.5H to a time period of 262.5H (one field) and the time period of 262H is obtained by subtracting 0.5H from the time period of 262.5H (one field). The output digital data of the DRAM 65 is supplied to the D/A converter 87 wherein the digital data is converted into an analog signal based on the clock pulse having the frequency of approximately 7.16 MHz.

Figure 7:
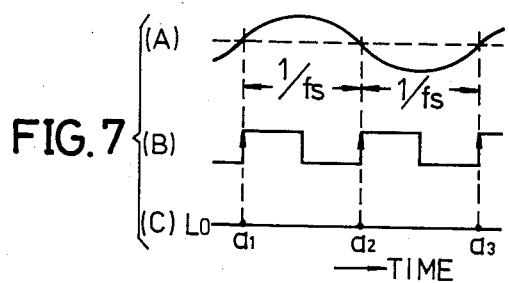
FIGS. 7(A) through 7(C), FIGS. 8(A) through 8(C) and FIGS. 9(A) through 9(D) show signal waveforms for explaining the operation of the one-field delay circuit shown in FIG. 6.
Figure 8:
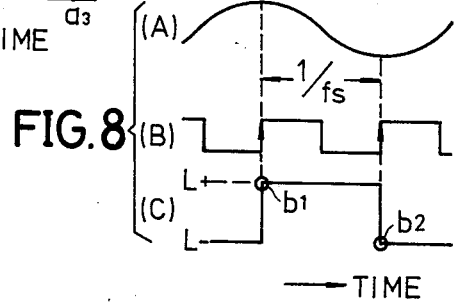
Figure 9:
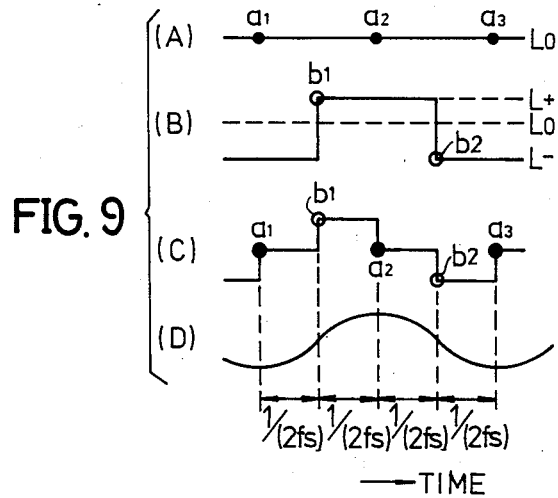

Accordingly, when it is assumed that the reproduced luminance signal of one field plus 0.5H (263H) before has a sinusoidal waveform shown in FIG. 7(A) and the reproduced luminance signal of one field minus 0.5H (262H) before has a sinusoidal waveform shown in FIG. 8(A), the output clock pulse (having the frequency $f_s$) of the frequency divider 85 which is supplied to a sampler within the A/D converter 82 has a signal waveform shown in FIGS. 7(B) and 8(B). When it is assumed that the sampling is performed responsive to the rise in the clock pulse, the sampled signal waveform of 263H before becomes as shown in FIGS. 7(C) and 9(A) having a level $L_0$, and the sampled signal waveform of 262H before becomes as shown in FIGS. 8(C) and 9(B). In other words, the sampled signal waveform of 262H before is a pulse waveform alternately assuming a low level $L-$ and a high level $L+$. In FIGS. 7(C), 9(A) and 9(C), black circular marks a1, a2 and a3 indicate values at sampling points of a period $1/f_s$. In FIGS. 8(C), 9(B) and 9(C), unfilled circular marks b1 and b2 indicate values at sampling points of a period $1/f_s$.

The DRAM 65 is written with the digital data of the sampled signal described before, and the digital data of 263H before and the digital data of 262H before are alternately read out from the DRAM 65 under the control of the control circuit 86 with a frequency $2f_s$ (approximately equal to 7.16 MHz in this case) which is twice the sampling frequency $f_s$ in the A/D converter 82. The digital data read out from the DRAM 65 is supplied to the D/A converter 87 and is converted into an analog signal. Accordingly, the output signal of the D/A converter 87 assumes such a staircase waveform that the sampled values are obtained with a period of $\frac{1}{2}f_s$ in a sequence a1→b1→a2→b2→a3→ . . . and each sampled value is held between two adjacent sampled values as shown in FIG. 9(C). The output signal of the D/A converter 87 is passed through a lowpass filter 88 having an upper limit cutoff frequency of approximately 3 MHz, which lowpass filter 88 is provided for eliminating the aliasing noise. As a result, a reproduced luminance signal which is delayed by 262H or 263H as shown in FIG. 9(D) is obtained through the output terminal 68.

The reproduced luminance signal which is delayed by one field and is obtained through the output terminal 68, has a band which is widened to approximately 3.0 MHz even when the DRAM 65 which is used in the one-field delay circuit can normally have a band in the range of only 1.5 MHz. The information of a number of sampling points approximately equal to a value obtained by dividing the sampling frequency $f_s$ by the horizontal scanning frequency $f_H$ is time-sequentially displayed on one scanning line, which number of sampling points is equal to a natural number. However, as described before, the sampling frequency $f_s$ is equal to 3.58 MHz which is an odd number multiple of one-half the horizontal scanning frequency $f_H$. Thus, in the reproduced picture of the same field, the output digital data of the A/D converter 82 is displayed so that the information of 227 sampling points is displayed on one scanning line and the information of 228 sampling points is displayed on the next scanning line. In other words, the information of the sampling points displayed on one scanning line and the information of the sampling points displayed on the next scanning line are displayed at positions mutually different by a time period of $\frac{1}{2}f_s$ in the horizontal scanning direction.

Figure 10:
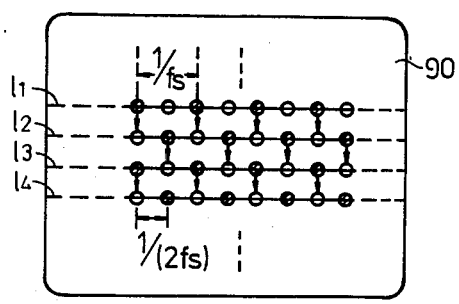
FIG. 10 shows sampling positions within a reproduced picture for explaining the band of a delayed video signal from the one-field delay circuit shown in FIG. 6.

FIG. 10 shows a reproduced picture 90 of a certain one field, where four arbitrary adjacent scanning lines are designated by $l_1$, $l_2$, $l_3$ and $l_4$. The signals related to the sampling points of one field minus 0.5H before obtained by the sampling performed at the sampling frequency $f_s$, are displayed at positions indicated by circular marks with the hatchings on each of the scanning lines $l_1$ through $l_4$, which displayed positions are mutually different between mutually adjacent scanning lines by a time period of $\frac{1}{2}f_s$ in the horizontal scanning direction. On the other hand, the signal related to the sampling points of one field plus 0.5H before obtained by the sampling performed at the sampling frequency $f_s$, are displayed at positions indicated by circular marks without the hatchings on each of the scanning lines $l_1$ through $l_4$, which displayed positions are mutually different between mutually adjacent scanning lines by a time period of $\frac{1}{2}f_s$ in the horizontal scanning direction. In other words, since the signals related to the sampling points of one field plus 0.5H before lag the signals related to the sampling points of one field minus 0.5H before by 1H, the signals displayed at the positions indicated by the circular marks with the hatchings are moved in the vertical direction of the picture by one scanning line as indicated by the arrows in FIG. 10 and are displayed at the positions indicated by the circular marks without the hatchings on the corresponding adjacent scanning lines.

However, the signals related to the sampling points of one field plus 0.5H before and the signals related to the sampling points of one field minus 0.5H before are alternately arranged time-sequentially with the period of $\frac{1}{2}f_s$ in the signal obtained from the D/A converter 87. As a result, the signal obtained from the D/A converter 87 is displayed at the positions indicated by the circular marks with the hatchings and the positions indicated by the circular marks without the hatchings on each of the scanning lines $l_1$ through $l_4$. In other words, the output delayed reproduced luminance signal of the D/A converter 87 is a signal which is sampled at a sampling frequency which is essentially twice the output clock pulse frequency $f_s$ of the frequency divider 85 supplied to the A/D converter 82 as the sampling pulse. Thus, the signal which is displayed has a band wider than the band of the DRAM 65.

In order to obtain the delayed reproduced luminance signal having the widened band, the clock pulse supplied to the A/D converter 82 as the sampling pulse must have a phase which is inverted for every 1H. In the present embodiment, the frequency divider 85 produces the signal having a frequency of 3.58 MHz which is an odd number multiple of one-half the horizontal scanning frequency $f_H$ and the phase of this signal from the frequency divider 85 is automatically inverted for every 1H. However, it is possible to obtain the signal having the phase which is inverted for every 1H by other means. For example, an output pulse of an oscillator having a frequency other than the output signal frequency of the frequency divider 85 may be supplied directly to a switch and indirectly to the switch through an inverter, and the switching of the switch may be controlled to alternately pass the output pulse of the oscillator and the output pulse of the inverter for every 1H.

Figure 11:
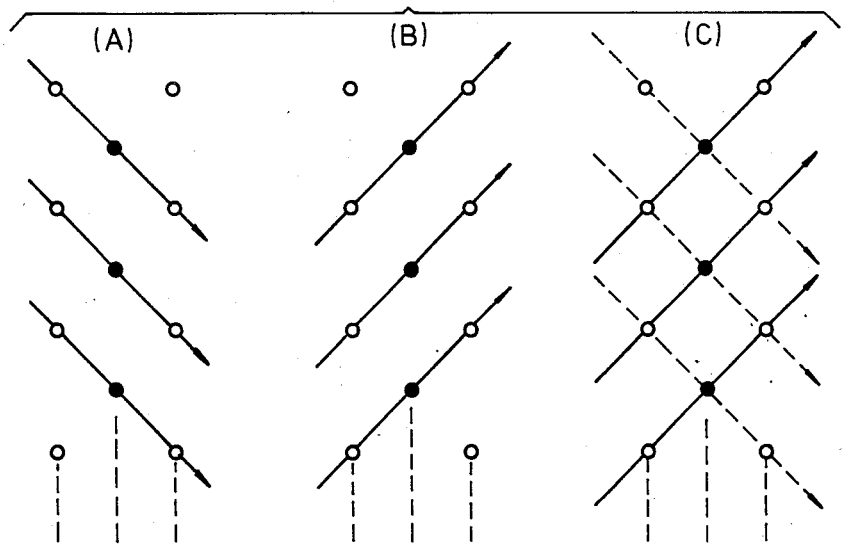
FIGS. 11(A) through 11(C) are diagrams for explaining the generation of smear in the case of the conventional circuit and in the case of the one-field delay circuit shown in FIG. 6.

In the present embodiment, the delay time is alternately switched between one field plus 0.5H (263H) and one field minus 0.5H (262H) for every time period which is 1/455 times 1H. For this reason, it is possible to visually reduce the smear in the reproduced picture. In other words, in a case where a delay circuit having a fixed delay time of 263H or a delay circuit having a fixed delay time of 262H is used for the one-field delay circuit 34 within the noise reduction circuit shown in FIG. 2, the smear occurs in the downward direction as indicated by arrows in FIG. 11(A) when the fixed delay time is equal to 263H and the smear occurs in the upward direction as indicated by arrows in FIG. 11(B) when the fixed delay time is equal to 262H, because the noise reduction circuit shown in FIG. 2 uses the field correlation which is constantly and positionally deviated in a predetermined direction by 0.5H. In FIGS. 11(A) through 11(C), the vertical direction represents the vertical direction of the picture, the horizontal direction represents the time in terms of field, unfilled circular marks indicate cross sections of scanning lines in the odd field and black circular marks indicate the cross section of scanning lines in the even field.

On the other hand, according to the present embodiment in which the one-field delay circuit having the delay time thereof alternately switched between 262H and 263H for every sampling period is used for the one-field delay circuit 34 within the noise reduction circuit shown in FIG. 2, the smear alternately occurs in the direction indicated by solid arrows shown in FIG. 11(C) and in the direction indicated by phantom arrows shown in FIG. 11(C). In other words, the smear is not stationary within the reproduced picture and is distributed, and for this reason, the smear is visually inconspicuous according to the present embodiment.

Next, a description will be given with respect to a third embodiment of the one-field delay circuit 34 by referring to FIG. 12. In FIG. 12, those parts which are the same as those corresponding parts in FIG. 6 are designated by the same reference numerals, and their description will be omitted. The present embodiment is characterized in that analog shift registers 101 and 102 having a construction such as that shown in FIG. 3B are used as delay circuit elements instead of the DRAM. In a one-field delay circuit 34c shown in FIG. 12, the analog shift register 101 comprises, for example, an input horizontal transfer register comprising a CCD having 228 cells arranged in a row (horizontally), 228 columns of vertical transfer registers each comprising a CCD having cells arranged in a 261 row by 228 column matrix arrangement, and an output horizontal transfer register supplied in parallel with output signals of cells in the last stage (row) of each of the vertical transfer registers and comprising a CCD having 228 cells arranged in a row. The output horizontal transfer register produces a serial output. On the other hand, the analog shift register 102 comprises a horizontal transfer register comprising a CCD having 228 cells arranged in a row.

Two vertical transfer pulses obtained by way of the synchronizing signal separating circuit 83 and a vertical transfer pulse generating circuit 103, are supplied to the vertical transfer registers of the analog shift register 101 so as to perform vertical transfers. The two vertical transfer pulses are generated within the horizontal blanking period, and have a period of 1H and mutually different phases. Two horizontal transfer pulses obtained by passing the output pulse (having the frequency of 3.58 MHz in this case) of the frequency divider 85 through a horizontal transfer pulse generating circuit 104, are supplied to the input and output horizontal transfer registers of the analog shift register 101. The two horizontal transfer pulses have mutually different phases, and are generated 228 times within a time period of approximately 1H excluding the time period in which the vertical transfer pulses are generated. The reproduced luminance signal which is sampled at the sampling frequency $f_s$, is transferred horizontally within the input and output horizontal transfer registers of the analog shift register 101 responsive to the horizontal transfer pulses. The operation of the analog shift register is similar to that of the conventional circuit explained before in conjunction with FIG. 3. Hence, the analog shift register 101 delays the reproduced luminance signal by 262H and supplies the delayed reproduced luminance signal to the analog shift register 102 in the next stage and to a switching circuit 105. The analog shift register 102 performs a horizontal transfer responsive to the horizontal transfer pulses from the horizontal transfer pulse generating circuit 104, and further delays the delayed reproduced luminance signal by 1H. Therefore, a reproduced luminance signal which is delayed by a total delay time of 263H is produced from the analog shift register 102 and is supplied to a switching circuit 106.

The switching of the switching circuit 105 is controlled responsive to the output pulse of the frequency divider 85. On the other hand, the switching of the switching circuit 106 is controlled responsive to a switching pulse which is obtained by passing the output pulse of the frequency divider 85 through an inverter 107. The switching circuits 105 and 106 are turned ON only for the instant when the switching pulse applied thereto rises, and are turned OFF during other times. Hence, the switching circuits 105 and 106 are alternately turned ON for an extremely short time for every time period which is an inverse number of the frequency $2f_s$ (approximately 7.16 MHz in this case). Accordingly, the sampled information of the reproduced luminance signal which is delayed by 262H and the sampled information of the reproduced luminance signal which is delayed by 263H are alternately obtained from the switching circuits 105 and 106 for every time period which is the inverse number of the frequency $2f_s$, and are supplied to a hold circuit 109 through an adder 108.

Therefore, a delayed reproduced luminance signal having a band which is widened as in the case of the output signal of the D/A converter 87 shown in FIG. 6, is obtained from the hold circuit 109. The delayed reproduced luminance signal from the hold circuit 109 is supplied to a lowpass filter 110.

In the present third embodiment, it is possible to obtain a delayed reproduced luminance signal having a band wider than the transmission band of the analog shift registers 101 and 102 and the smear is made visually inconspicuous, similarly as in the case of the second embodiment described before.

However, in the embodiments described heretofore, the noise reduction circuit also attenuates the high-frequency component having the small amplitude, and for this reason, the resolution of the small amplitude component is deteriorated as described previously. The reproduced picture itself is not greatly affected by such deterioration in the resolution of the small amplitude component. But in a case where this noise reduction circuit is applied to a video signal reproducing apparatus which already has a circuit for performing the noise cancelling, the noise cancelling will be performed twice and there is a problem in that the resolution of the small amplitude component will become greatly deteriorated.

Accordingly, a second embodiment of the noise reduction circuit 25 in which the above described problem is eliminated, will now be described in conjunction with FIG. 13. In FIG. 13, those parts which are the same as those corresponding parts in FIG. 2 are designated by the same reference numerals.

In FIG. 13, the reproduced luminance signal applied to the input terminal 31 is supplied to the subtracting circuit 32 and to the subtracting circuit 33 through a filter circuit 120. The reproduced luminance signal obtained from the subtracting circuit 32 is supplied to the subtracting circuit 33 through the one-field delay circuit 34. The sampling frequency in the one-field delay circuit 34 is selected to one-half that of the conventional circuit as described before. Consequently, only the signal component having the band of 0 to 1.5 MHz which is approximately one-half the transmission band of 0 to 3 MHz of the reproduced luminance signal, can be transmitted by the one-field delay circuit 34. The frequency characteristic of the one-field delay circuit 34 is shown in FIG. 14. The frequency characteristic of the filter circuit 120 is selected to a frequency characteristic which is approximately the same as the frequency characteristic of the one-field delay circuit 34 shown in FIG. 14.

The subtracting circuit 33 subtracts from the narrow band signal component of the present field obtained from the filter circuit 120 the narrow band signal component of one field before obtained from the one-field delay circuit 34, where the latter narrow band signal component is approximately the same as the former narrow band signal component. The subtracting circuit 33 produces as a result of the subtraction a signal component and noise which have no field correlation within the band shown in FIG. 14. The output of the subtracting circuit 33 is passed through the limiter 35 and the coefficient multiplying circuit 36 and is supplied to the subtracting circuit 32.

Figure 15A:
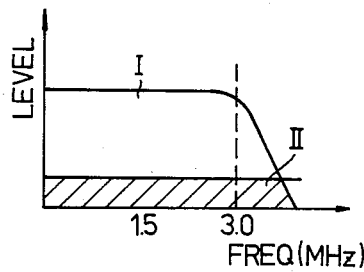
FIGS. 15A and 15B show frequency spectrums of an input signal and an output signal of the noise reduction circuit shown in FIG. 13, respectively.
Figure 15B:
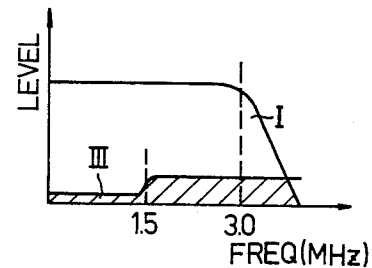

When it is assumed that the reproduced luminance signal applied to the input terminal 31 has the band of 0 to 3 MHz as indicated by a line I shown in FIG. 15A and that white noise is mixed in a part II indicated by the hatchings in FIG. 15A, the frequency spectrum of the reproduced luminance signal obtained from the subtracting circuit 32 becomes as shown in FIG. 15(B). As may be seen from FIG. 15(B), the noise is reduced in only the band (the same as the band shown in FIG. 14) of 0 to approximately 1.5 MHz out of the band I of the reproduced luminance signal, as shown by a part III indicated by the hatchings. In actual practice, the noise mixed into the reproduced luminance signal does not exist as shown by the part II in FIG. 15A, but it is assumed in FIG. 15A for convenience' sake that the white noise is mixed into the reproduced luminance signal.

When it is assumed that the reproduced luminance signal applied to the input terminal 31 has a perfect field correlation, the noise reduction circuit shown in FIG.

Figure 16:
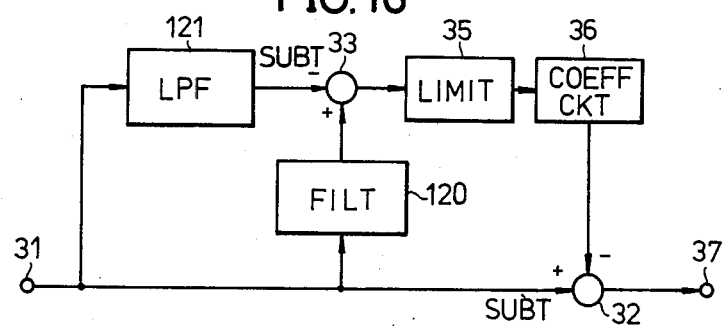
FIG. 16 is a circuit diagram showing an equivalent of the noise reduction circuit shown in FIG. 13.

13 may be considered equivalent to a circuit having a circuit construction shown in FIG. 16. In FIG. 16, those parts which are the same as those corresponding parts in FIG. 13 are designated by the same reference numerals, and their description will be omitted. Since the one-field delay circuit 34 has the frequency characteristic shown in FIG. 14, the noise reduction circuit shown in FIG. 13 is equivalent to the circuit shown in FIG. 16 in which a lowpass filter 121 for blocking a frequency component of over 1.5 MHz within the reproduced luminance signal applied to the input terminal 31 is provided between the input terminal 31 and the subtracting circuit 31.

Accordingly, when it is assumed that the filter circuit 120 is not provided, the signal component having a frequency of over 1.5 MHz and having a small amplitude lower than the limiting level of the limiter 35 is passed through the limiter 35 and the coefficient multiplying circuit 36 and is applied to the subtracting circuit 32. Hence, the signal component having the frequency of over 1.5 MHz and the small amplitude, is subtracted from the reproduced luminance signal from the input terminal 31. Thus, a reproduced luminance signal in which the signal component having the frequency of over 1.5 MHz and having the small amplitude is reduced, is obtained from the subtracting circuit 32. The noise within the reproduced luminance signal is mostly a high-frequency component having a small amplitude, and for this reason, the noise is reduced in the reproduced luminance signal obtained from the subtracting circuit 32. This reduction of noise is the noise cancelling referred to before. According to the noise cancelling, the high-frequency component having the small amplitude within the reproduced luminance signal is also reduced together with the noise, and the resolution in the horizontal direction of the picture becomes deteriorated with respect to the small amplitude component.

However, according to the present embodiment, the filter circuit 120 having the same frequency characteristic as the one-field delay circuit 34, is provided in the transmission path of the reproduced luminance signal which is supplied to the subtracting circuit 33 from the input terminal 31. Accordingly, the signals supplied to the subtracting circuit 33 have approximately the same band. In a case where the reproduced luminance signal has a perfect field correlation, the output signal of the subtracting circuit 33 is approximately zero. Hence, in this case, the signal supplied to the subtracting circuit 32 from the coefficient multiplying circuit 36 substantially does not exist so that the noise cancelling is not performed. Therefore, the resolution in the horizontal direction of the picture with respect to the small amplitude component does not become deteriorated according to the present embodiment. The noise cancelling also occurs when the input reproduced luminance signal does not have a perfect field correlation, and in this case, it is also possible to take the measure so as not to perform the noise cancelling.

In the case where the analog shift register having the construction shown in FIG. 3B is used for the one-field delay circuit 34, it is only possible to obtain a delay time which is a natural number multiple of the horizontal scanning period because each of the vertical transfer registers 57a through 57n comprises a natural number of stages (rows). Thus, it is impossible to obtain a delay time which is accurately equal to one field. That is, in the case of the reproduced luminance signal of the system employing 525 scanning lines, it is impossible to obtain a delay time which is accurately equal to 262.5H, and it is impossible to obtain a delay time which is accurately equal to 312.5H in the case of the reproduced luminance signal of the system employing 625 scanning lines. However, by selecting the delay time to a time period which is a natural number multiple of the horizontal scanning period and is extremely close to the time period of one field, it is possible to perform the desired noise reducing operation from the practical point of view.

Figure 17:
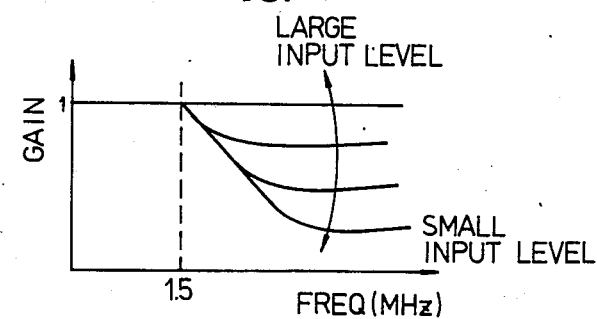
FIG. 17 shows the frequency characteristic of the circuit shown in FIG. 2 or 5.

Next, a detailed description will be given with respect to the correcting circuit 14 within the recording system shown in FIG. 1A. As described before in conjunction with FIGS. 2 and 5, the signal component within the input reproduced luminance signal, having the frequency of over 1.5 MHz and having the small amplitude lower than the limiting level of the limiter 35, is passed through the limiter 35 and the coefficient multiplying circuit 36 and is supplied to the subtracting circuit 32 wherein the signal component is subtracted from the input reproduced luminance signal. Hence, the circuits shown in FIGS. 2 and 5 have the frequency characteristic shown in FIG. 17, and attenuate the high-frequency component of over 1.5 MHz with an attenuation which becomes greater as the amplitude of the high-frequency component becomes larger.

As described before, the noise within the reproduced luminance signal is mostly a high-frequency component having a small amplitude, and the noise is reduced in the noise reduction circuit in the apparatus according to the present invention. However, the high-frequency component within the reproduced luminance signal, having the small amplitude, is also slightly reduced together with the noise, and the resolution in the horizontal direction of the picture becomes deteriorated with respect to the small amplitude component.

For this reason, in the recording system of the apparatus according to the present invention, the high-frequency component having the small amplitude within the luminance signal to be recorded, which will be deteriorated as described above, is emphasized in advance in the correcting circuit 14 so as to improve the resolution in the horizontal direction of the picture with respect to the small amplitude component. In other words, the correcting circuit 14 is supplied with the luminance signal which is to be recorded, and amplifies the amplitude of the high-frequency component having the small amplitude within the luminance signal. The frequency characteristic of the correcting circuit 14 is selected to a frequency characteristic which is approximately complementary to the frequency characteristic of the noise reduction circuit 25.

Figure 18:
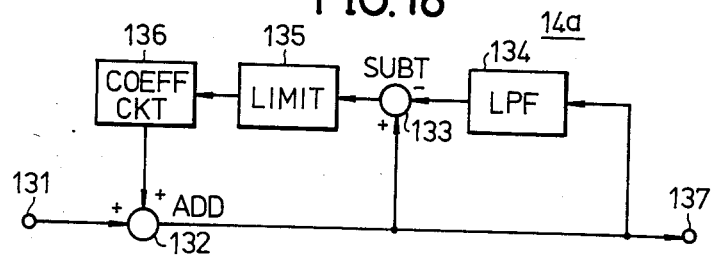
FIG. 18 is a system block diagram showing a first embodiment of a correcting circuit in the block system shown in FIG. 1A.

Next, a description will be given with respect to each of embodiments of the correcting circuit 14. FIG. 18 shows a system block diagram of a first embodiment of the correcting circuit 14 shown in FIG. 1A. In FIG. 18, the luminance signal which is to be recorded and is obtained from the lowpass filter 12 shown in FIG. 1A and is applied to an input terminal 131 of a correcting circuit 14a. The luminance signal from the input terminal 131 is passed through an adder 132 and is supplied to a subtracting circuit 133. An output luminance signal of the adder 132 is also supplied to the subtracting circuit 133 through a lowpass filter 134. The frequency characteristic of the lowpass filter 134 is selected to a frequency characteristic which is the same as the frequency characteristic of the one-field delay circuit 34, and the upper limit cutoff frequency is selected to approximately 1.5 MHz. The subtracting circuit 133 subtracts an output low-frequency luminance signal component of the lowpass filter 134 from the output luminance signal of the adder 132, and produces a high-frequency luminance signal component of over 1.5 MHz. The output signal of the subtracting circuit 133 is passed through a limiter 135 and a coefficient multiplying circuit 136 and is supplied to the adder 132. The limiter 135 has a characteristic similar to that of the limiter 35 shown in FIG. 2, and the coefficient multiplying circuit 136 has a characteristic similar to that of the coefficient multiplying circuit 36 shown in FIG. 2.

Figure 19:
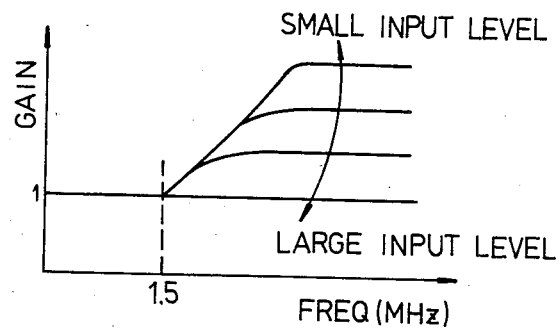
FIG. 19 shows the frequency characteristic of a correcting circuit within the block system shown in FIG. 18.

Accordingly, the input luminance signal supplied to the adder 132 is amplified of the high-frequency component thereof of over 1.5 MHz, and the output signal of the adder 132 is obtained through an output terminal 137. The amplification becomes larger as the amplitude of the high-frequency component of the input luminance signal becomes smaller. Thus, the correcting circuit 14a of the recording system has a frequency characteristic shown in FIG. 19 which is approximately complementary to the frequency characteristic of the noise reduction circuit 25 shown in FIG. 17 of the reproducing system.

Figure 20:
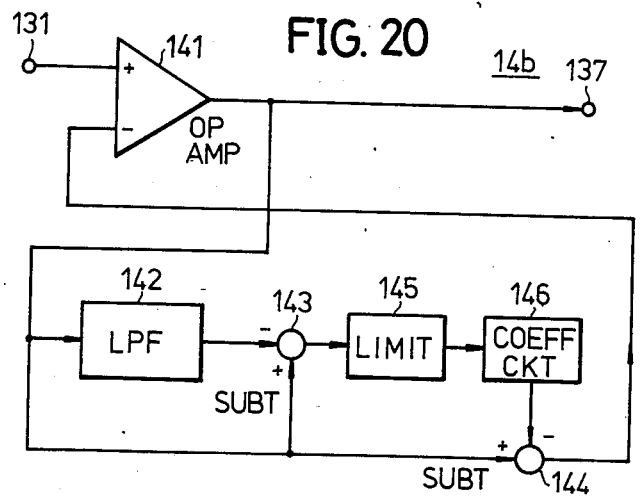
FIG. 20 is a system block diagram showing a second embodiment of the correcting circuit.

Next, a description will be given with respect to a second embodiment of the correcting circuit 14 by referring to FIG. 20. In FIG. 20, those parts which are the same as those corresponding parts in FIG. 18 are designated by the same reference numerals. The input luminance signal applied to the input terminal 131 of a correcting circuit 14b shown in FIG. 20, is supplied to a non-inverting input terminal of an operational amplifier 141 ideally having an infinite gain (actually, a gain of over 40 dB). An output terminal of the operational amplifier 141 is connected to the output terminal 137. A negative feedback circuit part comprising a lowpass filter 142, subtracting circuits 143 and 144, a limiter 145 and a coefficient multiplying circuit 146, is provided in a negative feedback path between the output terminal of the operational amplifier 141 and an inverting input terminal of the operational amplifier 141. This negative feedback circuit part has the same circuit construction and the same frequency characteristic as those of the circuit shown in FIG. 5 which is equivalent to the noise reduction circuit. Thus, the correcting circuit 14b shown in FIG. 20 produces through the output terminal 137 a luminance signal which is obtained by performing a differential amplification between the input luminance signal applied to the input terminal 131 and the output high-frequency luminance signal component of the subtracting circuit 144. The correcting signal 14b has a frequency characteristic similar to the frequency characteristic of the correcting circuit 14a shown in FIG. 19.

Figure 21:
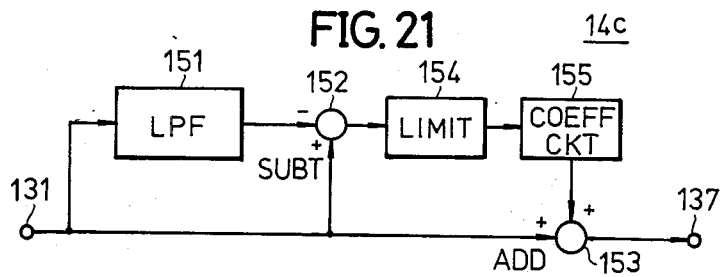
FIG. 21 is a system block diagram showing a third embodiment of the correcting circuit.

Next, a description will be given with respect to a third embodiment of the correcting circuit 14 by referring to FIG. 21. In FIG. 21, those parts which are the same as those corresponding parts in FIG. 18 are designated by the same reference numerals. The input luminance signal applied to the input terminal 131 of a correcting circuit 14c shown in FIG. 21, is passed through a lowpass filter 151 which has the same frequency characteristic as that of the one-field delay circuit 34 shown in FIG. 14. A subtracting circuit 152 is supplied with the input luminance signal from the input terminal 131 and an output luminance signal of the lowpass filter 151. The input luminance signal from the input terminal 131 is also supplied to an adder 153. A high-frequency luminance signal component of over 1.5 MHz is obtained from the subtracting circuit 152, and is passed through a limiter 154 and a coefficient multiplying circuit 155. An output signal of the coefficient multiplying circuit 155 is supplied to the adder 153 and is added with the input luminance signal from the input terminal 131. An output luminance signal of the adder 153 is obtained through the output terminal 137.

According to the present embodiment, the transfer function of the circuit does not coincide with the transfer function of a circuit which has a frequency characteristic perfectly complementary to the frequency characteristic of the circuit shown in FIG. 5 which is equivalent to the noise reduction circuit. Hence, it is impossible by use of the correcting circuit 14c shown in FIG. 21 to obtain a frequency characteristic perfectly complementary to the frequency characteristic of the circuit shown in FIG. 5. However, by adjusting the limiting level of the limiter 154 and the multiplying coefficient of the coefficient multiplying circuit 155, it is possible to obtain a frequency characteristic which is approximately the same as the frequency characteristic shown in FIG. 19 and is complementary to the frequency characteristic of the circuit shown in FIG. 5. In addition, unlike in the case of the correcting circuits 14a and 14b, the correcting circuit 14c does not have a negative feedback loop. In other words, the correcting circuit 14c is a non-recursive type circuit, and the operation thereof is stable. The correcting circuits 14a and 14b are recursive type circuits and the operation thereof may become unstable in the high-frequency range, but in such a case, a highpass filter may be inserted within the feedback loop to stabilize the operation.

Figure 22A:
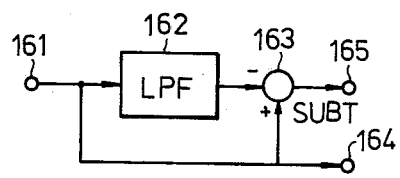
FIGS. 22A and 22B are a circuit diagram showing a part of the correcting circuits shown in FIGS. 18, 20 and 21 and a circuit diagram showing an equivalent of the circuit shown in FIG. 22B.
Figure 22B:
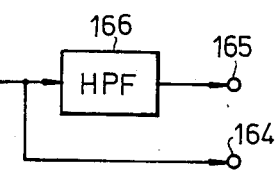

Each of the correcting circuits 14a, 14b and 14c shown in FIGS. 18, 20 and 21, comprises a circuit part having the construction shown in FIG. 22A. That is, in the circuit part shown in FIG. 22A, an input signal applied to an input terminal 161 is passed through a lowpass filter 162 (corresponding to the lowpass filters 134, 142 and 151) and is supplied to a subtracting circuit 163 (corresponding to the subtracting circuits 133, 140 and 152). On the other hand, the input signal applied to the input terminal 161 is supplied directly to the subtracting circuit 163 and is also produced through an output terminal 164. Further, an output high-frequency signal component of the subtracting circuit 163 is produced through an output terminal 165. However, it is possible to obtain a signal which is essentially the same as a signal which has passed through a highpass filter, by performing a subtraction between a signal which has passed through a lowpass filter and a signal which has not passed through the lowpass filter. Hence, the lowpass filter 162 and the subtracting circuit 163 shown in FIG. 22A may be replaced by a highpass filter 166 shown in FIG. 22B. Therefore, the lowpass filter 134 and the subtracting circuit 133 shown in FIG. 18, the lowpass filter 142 and the subtracting circuit 143 shown in FIG. 20 and the lowpass filter 151 and the subtracting circuit 152 shown in FIG. 21 which are arranged as shown in FIG. 22A, may be replaced by the highpass filter 166 shown in FIG. 22B.

Figure 1B:
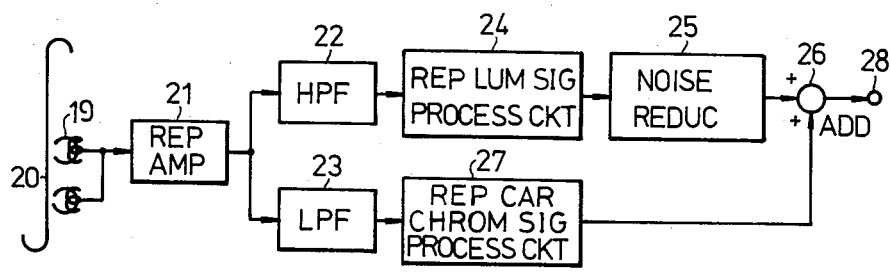
Figure 23A:
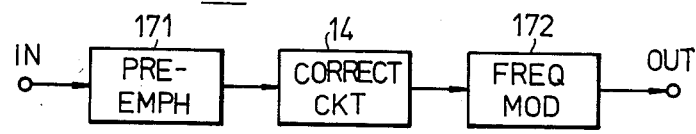
FIG. 23A is a system block diagram showing a case where the correcting circuit shown in FIG. 1A is provided within a recording luminance signal processing circuit.
Figure 23B:
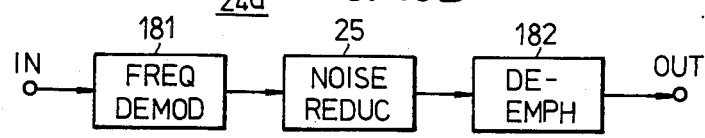
FIG. 23B is a system block diagram showing a case where the noise reduction circuit shown in FIG. 1B is provided within a reproduced luminance signal processing circuit.

In the embodiments shown in FIGS. 1A and 1B, the correcting circuit 14 is provided in a stage preceding the recording luminance signal processing circuit 15, and the noise reduction circuit 25 is symmetrically provided in a stage subsequent to the reproduced luminance signal processing circuit 24. However, the present invention is not limited to this arrangement. For example, the correcting circuit 14 may be provided within the recording luminance signal processing circuit 15, and the noise reduction circuit 25 may be provided within the reproduced luminance signal processing circuit 24. For example, the correcting circuit 14 may be provided within a recording luminance signal processing circuit 15a in a transmission path between a pre-emphasis circuit 171 and a frequency modulator 172, as shown in FIG. 23A. In this case, the noise reduction circuit 25 must be provided at a symmetrical position in the reproducing system. That is, the noise reduction circuit 25 is provided within a reproduced luminance signal processing circuit 24a in a transmission path between a frequency demodulator 181 and a de-emphasis circuit 182, as shown in FIG. 23B.

Further, the present invention is not limited to those embodiments, but various variations and modifications may be made without departing from the scope of the present invention.

What is claimed is:

1. A video signal reproducing apparatus comprising:
    reproducing means for reproducing from a recording medium a pre-recorded video signal, said pre-recorded video signal having field correlation and having a predetermined band; and
    a noise reduction circuit supplied with a reproduced video signal from said reproducing means for essentially reducing noise included within the reproduced video signal,
    said noise reduction circuit comprising first and second subtracting circuits supplied with the reproduced video signal from said reproducing means, a one-field delay circuit for delaying an output of said first subtracting circuit by a predetermined time period and for supplying a delayed signal to said second subtracting circuit, said predetermined time period being equal to one field or a time period which is a natural number multiple of one horizontal scanning period and is extremely close to one field, and limiter for amplitude-limiting an output of said second subtracting circuit and for supplying an amplitude limited signal to said first subtracting circuit,
    said output of said first subtracting circuit being obtained as an output of said noise reduction circuit,
    said one-field delay circuit having a transmission band which is narrower than a band of said reproduced video signal.

2. A video signal reproducing apparatus as claimed in claim 1 in which said transmission band of said one-field delay circuit is one-half the band of said reproduced video signal.

3. A video signal reproducing apparatus as claimed in claim 1 in which said one-field delay circuit comprises clock pulse generating means for generating first and second clock pulses, said second clock pulse having a repetition frequency which is greater than or equal to twice an upper limit frequency of the band of said reproduced video signal, said first clock pulse having a repetition frequency which is approximately one-half that of said second clock pulse and having a phase which is inverted for every one horizontal scanning period, and delay means having a transmission band narrower than the band of said reproduced video signal, said delay means storing therein signals obtained by sampling said reproduced video signal by said first clock pulse from said clock pulse generating means and alternately reading out therefrom among the stored signals a signal stored a first time period before and a signal stored a second time period before, said first time period being equal to a time period of one field plus one-half the horizontal scanning period, said second time period being equal to a time period of one field minus one-half the horizontal scanning period.

4. A video signal reproducing apparatus as claimed in claim 3 in which said delay means comprises a lowpass filter for limiting the band of said reproduced signal from said reproducing means into a narrower band, an analog-to-digital converter for converting an output signal of said lowpass filter into a digital signal, a random access memory for storing the output digital signal of said analog-to-digital converter, and a digital-to-analog converter for converting the digital signal read out from said random access memory into an analog signal.

5. A video signal reproducing apparatus as claimed in claim 4 in which said lowpass filter has an upper limit cutoff frequency which is equal to one-half the upper limit frequency of the band of said reproduced video signal.

6. A video signal reproducing apparatus as claimed in claim 3 in which said delay means comprises an input horizontal transfer register serially supplied with said reproduced video signal for horizontally transferring said reproduced video signal responsive to said first clock pulse, a plurality of columns of vertical transfer registers supplied in parallel with signals which are obtained by sampling said input video signal stored in said input horizontal transfer register by said first clock pulse for performing one vertical transfer for every one horizontal scanning period, each of said vertical transfer registers having a plurality of stages, and an output horizontal transfer register for storing signals supplied thereto in parallel from the last stage of each of said vertical transfer registers and for producing a serial output in phase synchronism with said first clock pulse.

7. A video signal reproducing apparatus as claimed in claim 1 which further comprises a filter circuit having a frequency characteristic which is essentially the same as a frequency characteristic of said one-half delay circuit, said filter circuit being provided in a transmission path for supplying said reproduced video signal to said second subtracting circuit.

8. A video signal reproducing apparatus as claimed in claim 7 in which said filter circuit comprises a lowpass filter.

9. A video signal recording and reproducing apparatus comprising:
    a correcting circuit having a predetermined frequency characteristic and supplied with a recording video signal which is to be recorded, said recording video signal having field correction;
    recording means for subjecting an output signal of said correcting circuit to a predetermined signal processing and for recording the processed signal on a recording medium;
    reproducing means for reproducing from said recording medium the video signal which is recorded on said recording medium by said recording means, an output reproduced video signal of said reproducing means having a predetermined band; and
    a noise reduction circuit supplied with the reproduced video signal from said reproducing means for essentially reducing noise included within the reproduced video signal, said noise reduction circuit having a specific frequency characteristic, said noise reduction circuit comprising first and second subtracting circuits supplied with the reproduced video signal from said reproducing means, a one-field delay circuit for delaying an output of said first subtracting circuit by a predetermined time period and for supplying a delayed signal to said second subtracting circuit, said predetermined time period being equal to one field or a time period which is a natural number multiple of one horizontal scanning period and is extremely close to one field, and a limiter for amplitude-limiting an output of said second subtracting circuit and for supplying an amplitude limited signal to said first subtracting circuit, said output of said first subtracting circuit being obtained as an output of said noise reduction circuit, said one-field delay circuit having a transmission band which is narrower than a band of said reproduced video signal, said predetermined frequency characteristic of said correcting circuit being approximately complementary to said specific frequency characteristic of said noise reduction circuit.

10. A video signal recording and reproducing apparatus as claimed in claim 9 in which said correcting circuit comprises an adder supplied with said recording video signal, a lowpass filter supplied with an output of said adder, a third subtracting circuit supplied with outputs of said adder and said lowpass filter, and a second limiter for amplitude-limiting an output of said third subtracting circuit and for supplying the amplitude limited signal to said adder, said output signal of said correcting circuit being obtained from said adder.

11. A video signal recording and reproducing apparatus as claimed in claim 9 in which said correcting circuit comprises an operational amplifier having a non-inverting input terminal supplied with said recording video signal, a lowpass filter supplied with an output of said operational amplifier, a third subtracting circuit supplied with the output of said operational amplifier and an output of said lowpass filter, a second limiter for amplitude-limiting an output of said third subtracting circuit, and a fourth subtracting circuit supplied with the output of said operational amplifier and an output of said second limiter, said operational amplifier having an inverting input terminal supplied with an output of said fourth subtracting circuit, said output of said operational amplifier being obtained as an output signal of said correcting circuit.

12. A video signal recording and reproducing apparatus as claimed in claim 9 in which said correcting circuit comprises a lowpass filter supplied with said recording video signal, a third subtracting circuit supplied with an output of said lowpass filter and said recording video signal, a second limiter for amplitude-limiting an output of said third subtracting circuit, and an adder supplied with an output of said second limiter and said recording video signal, an output of said adder being obtained as an output signal of said correcting circuit.

* * * * *